July 26, 1966          G. DURET ETAL          3,262,182
METHOD OF MANUFACTURING METAL STRIPS OR SHEETS
Filed Oct. 8, 1962

INVENTORS
GEORGES DURET
LUCIEN ALFILLE

BY *Fritz G. Hochwald*

AGT.

3,262,182
METHOD OF MANUFACTURING METAL STRIPS OR SHEETS
Georges Duret, Antony, and Lucien Alfille, Paris, France, assignors to The Commissariat à l'Energie Atomique, Paris, France, a society of France
Filed Oct. 8, 1962, Ser. No. 229,120
Claims priority, application France, Oct. 13, 1961, 875,840
2 Claims. (Cl. 29—18)

The present invention relates to a method of manufacturing metal strips or sheets, in particular thin ones, by cutting or unwinding by means of a cutting tool the edge of which attacks the side surface of a rotating cylindrical piece.

The known methods, in particular by simple or crossed rolling, permit only the difficult obtainment of thin metal strips or crystallized structure having a low symmetry and of a thickness lower than 0.2 mm.

The chief object of the present invention is to make such methods so that they comply with the requirements of practice, and in particular permit of obtaining very thin strips.

According to our invention, a strip or sheet of metal is cut or unwound by means of a cutting tool the edge of which cuts into the side surface of a cylindrical piece having a relative rotary movement about its axis and which has preferably undergone a preliminary treatment of orientation of the crystallites by suitable arts such as rolling, forging, and so on, the crystalline structure of said metal or alloy having a single main gliding plane and the invention consists in giving the cutting tool a bevelled shape with an apex angle at least equal to 50° and in disposing this tool in such manner with respect to the rotating cylindrical piece that the relief or clearance angle ranges approximately from 5° to 15° whereas the top rake ranges from about —10° to 25°, said main gliding plane being thus set in the direction of the thickness of said strip, which can then be used in nuclear applications, for instance to constitute nuclear fuel elements or as a lining or thermal insulation material acording to the methods in use.

All the features of our invention will become apparent in the course of the following detailed description with reference to the appended drawings given merely by of example and in which.

Figure 1:
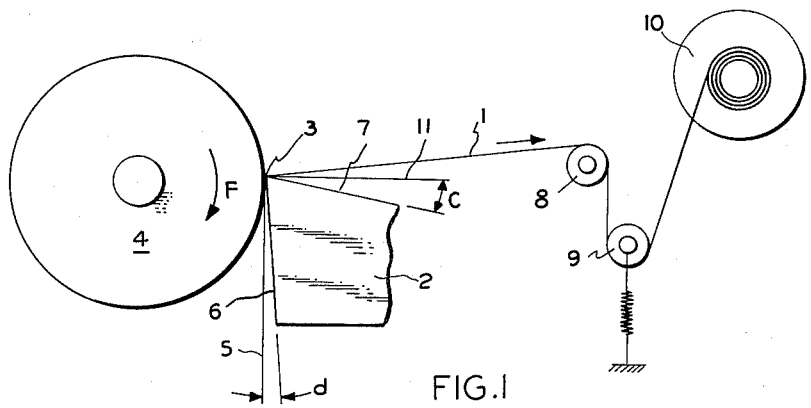
FIG. 1 is a vertical diagram showing a metal strip unwinding device acording to the invention.

According to the present invention supposing that it is desired to manufacture uranium, magnesium, zirconium and beryllium strips the following method is applied.

In order to obtain a strip of one of these metals it is cut or unwound by means of a fixed cutting tool 2, the edge 3 of which attacks the lateral surface of a cylindrical rotating piece 4 which has preferably undergone a preliminary treatment of the crystallites, for instance by rolling, forging, etc. Said tool 2 forms a bevel, the apex angle of which is at rest equal to 50°, and is disposed in such manner with respect to cylindrical piece 4 that the clearance angle $d$ (angle formed between the half plane tangent to the cylindrical rotary piece at the point where it is cut, said half plane extending in the sense of rotation of said piece and being diagrammatically shown by line 5, and the corresponding face 6 of the tool) ranges from about 5° to 15° and that the top rake angle $c$ (ranging from the normal 11 to said cylindrical piece and the outer face of the cutting tool 2) ranges from about —10° to +25° (the top rake angle being counted as positive if the two faces 6 and 7 of tool 2 are located on the same side with respect to said normal and as negative in the opposed case).

This method permits of easily obtaining strips of metals having a single main gliding plane (as hereinafter defined) such as uranium, magnesium, zirconium and beryllium.

It permits in particular of obtaining strips of these metals much thinner than those obtained by conventional methods for instance by rolling. These methods did not permit, or made it very difficult, of obtaining thicknesses smaller than 0.2 mm.

According to the present invention, metal strips have been obtained of a thickness as low as 0.01 mm.

The possibility of easily obtaining strip of these metals of a thickness smaller than 0.2 mm. is probably due to an effect of modification of the main gliding plane in the strip with respect to the direction it has in the initial piece.

As a matter of fact, uranium, magnesium, zirconium, and beryllium belong to crystalline systems which have a single main gliding plane.

When a crystal belonging to a non-cubic crystallographic system is subjected to deformations, there is generally determined a preferential direction of plane in which a portion of the crystal can glide with respect to the remainder. This plane direction defines the main gliding plane.

It is possible to bring into evidence the existence of such a main gliding, or slipping, plane, for instance by studying the shearing stresses of the crystal. We generally obtain a shearing stress much smaller in the direction of the main gliding plane than in any other direction.

This gliding plane is also brought into evidence by the orientation of the crystallites of a metal piece which is subjected to a rolling treatment. As a matter of fact, it is found that the crystallites then take an orientation such that the main gliding plane of each of the crsytals becomes parallel to the surface of the strip.

This main gliding plane generally corresponds to the plane in which the density of atoms per unit of area is maximum. Thus in magnesium, zirconium and beryllium, which belong to the hexagonal system, it is to the plane of crystallographic indexes (0001), in which the density of atoms is the highest, that the main gliding plane also corresponds.

An analogous phenomenon is observed in the case of uranium, which belongs to the ortho-rhombic system.

In a strip according to the invention, obtained by unwinding from a piece which has undergone a preliminary orientation treatment (therefore in which the main gliding plane of each of the crystallites was initially oriented in a direction parallel to the surface of said piece) examination by X-ray diffraction shows that said gliding planes are no longer parallel to the surface of the strip that is obtained, but make therewith an angle which may reach several tens of degrees.

This new orientation of the gliding planes is deduced from the first one by a rotation of these planes about a transverse axis which is perpendicular to the plane containing the unwinding direction and the normal to the rotary cylindrical piece.

Figure 2:
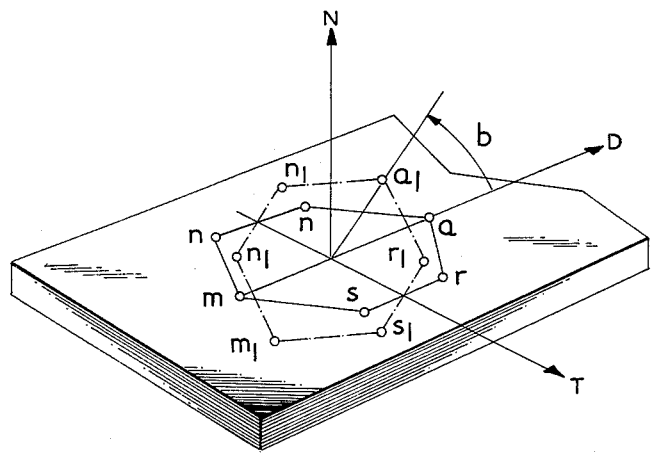
FIG. 2 shows the modification of the structure of a strip obtained by unwinding with respect to the structure of the initial piece from which said strip has been cut.

FIG. 2 illustrates this rotation of the gliding plane, for instance in the case of magnesium.

In this drawing, we have shown only the hexagonal base $mnpqrs$ in the plane of indexes (0001) of a prismatic elementary mesh of magnesium, which plane is parallel to the surface of the piece into which a strip will be cut. Arrow D shows the direction of unwinding.

If said piece has been obtained for instance by drawing, examination by X-ray diffraction also shows that the primatic plane (lateral side of the prism) of indexes $10\bar{1}0$ perpendicular to the basic plane is also perpendicular to the drawing direction and therefore, in the case that is considered, is parallel to the direction of unwinding.

On FIG. 2, we have shown the trace $np$ of this plane $10\bar{1}0$ on that of said hexagonal mesh. The orientation of the latter is therefore fully defined.

The straight line indicated at T constitutes an axis called "transverse axis" perpendicular to the normal N and to the unwinding direction D (which in the case of FIG. 2 is itself perpendicular to the rolling direction).

The hexagon $m_1n_1p_1q_1r_1s_1$ shown in dotted lines on FIG. 2 shows the position taken by hexagon $mnpqrs$ (i.e. by the basic plane of indexes 0001) after a rotation of angle $b$ about the transverse axis T due to unwinding and according to the invention.

From what precedes, it follows that in order to obtain by unwinding a strip having preferably a regular texture, the main gliding planes remaining parallel together over the whole length of the strip, the texture of the rotary cylindrical piece from which the strip is cut should also be regular, and that the main gliding planes of the crystallites of said piece are directed parallelly to the external surface of this piece. This preliminary state of the rotary cylindrical piece may be obtained through any suitable metallurgical treatment (drawing, rolling, forging, etc.).

It is possible, by unwinding from said rotary cylindrical pieces, to obtain very thin strips. It has been found, for instance, that in the case where it is desired to obtain strips of a thickness ranging from 0.01 to 0.05 mm., the choice of the top rake and clearance angle must not have any value whatever, and that the bevel angle of the cutting tool must be relatively great in particular greater than 50°. It is advantageous to use a clearance angle as small as possible, in order not to weaken the cutting tool, but still important enough to prevent the metal from accumulating and creating risks of sticking between the rotary piece and the corresponding face of the cutting tool. According as the case may be and in order to give the cutting a sufficiently important bevel angle, at least equal to 50°, the clearance angles will be chosen as ranging between 5° and 15°.

The top rake angle seems to be the most sensitive parameter. As a matter of fact, it is desirable in order to facilitate the pivoting of the gliding planes of the metal with respect to the surface of the strip obtained by unwinding to impart a substantial bending to the strip after it is cut. This implies the necessity of utilizing a top rake angle that is small and even negative in some cases. When the top rake angle becomes too great, for instance is greater than 25°, and correspondingly the bevel angle of the cutting tool becomes too small, it is found that the tool has a tendency to dip into the rotating cylindrical piece, which would have for its effect to produce considerable thickness variations and also, as a consequence, vibrations of the machines. Too small and even negative top rake angles would on the contrary have for their effect that the strip thus formed would have many shearing planes.

This noxious effect of too small a top rake angle may be partly compensated by supplying the rotary cylindrical piece with heat. For instance in the case of magnesium, for a clearance angle of 10°, shearing planes would appear for a top rake angle of +10°, or even more, without heating. By heating the rotary piece to about 200° C., this top rake angle equal to +10° seems on the contrary to be very favorable for the obtainment of a thin strip. At this temperature shearing planes appear only for an angle nearly equal to zero or even negative.

In some applications these shearing planes, which do not correspond to a very great inclination of the main gliding planes, do not generally constitute an obstacle to the use of the strip, because each of these shearing planes does not appear upon the whole of the width of the strip that is formed, which avoid disintegration of the strip. This will be the case in particular in applications wherein the strip is not subjected to longitudinal pulls, the coefficient of elongation of this strip being of course practically zero.

It is advantageous to provide winding means for collecting the strip as it is being formed. In the absence of such means, there are risks of not obtaining a smooth strip. It is possible to adjoin a stretching system to the winding means. Such a system comprises for instance a guiding roller 8, a stretching roller 9 and a flanged bobbin 10 the movement of rotation of which depends for instance, upon the speed of rotation of cylindrical piece 4, the strip that is formed being wound on said bobbin 10.

According to the applications that are considered, it will be possible to obtain the desired texture, in particular the inclination of the main gliding planes, by a suitable choice of the respective parameters such as the top rake angle and the clearance angle (within the limit above set forth), the linear speed of traveling of the strip and the working temperature.

In order to obtain a regular strip, it is advantageous to effect the unwinding thereof at high speed. The linear speed of this unwinding may advantageously range from 150 to 300 meters per minute.

The strip that is obtained has a smooth face (that which was in contact with the tool face) whereas the other face of said strip has a velvety and rough appearance, which is due to the sliding of the crystallites with respect to one another when the strip is moved forward.

Due to the modification of the orientation of the main gliding planes, we obtain in these strips a deep modification of their physical and mechanical properties which in particular are characterized by a strong anisotropy.

It was possible, in a strip obtained by the conventional methods such as rolling, to reduce the effects of anisotropy of the mechanical and physical properties in a plane, for instance by a crossed rolling treatment. The only method that was considered and which was not always possible for practical purposes, to reduce this anisotropy effect also in the third direction, i.e. also in the direction of thickness would consist in effect a structural change of phase by elevation of temperature.

The cutting of strips by means of the method above described, permits of reducing said anisotropy effects.

In the case of uranium for instance, the crystal has a maximum elongation along the crystallographic axis of $\{010\}$. In a strip obtained by rolling, this axis remains always parallel to the surface of the strip or sheet that is obtained, so that elongation always takes place in the direction of the length or of the width of this strip. Now this orientation is very noxious for the behaviour in a nuclear pile of such bands or strips used as nucelar fuel.

In a strip according to the invention, this elongation, or at least a component thereof, is in the direction of thickness, so that such strips are easier to apply when they are used as a nuclear fuel.

Figure 3:
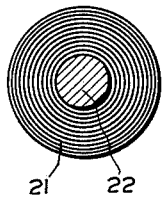
FIG. 3 is a transverse sectional view of a nuclear fuel element consisting of a strip of natural uranium according to the invention.

We may constitute (FIG. 3) a fuel element by the winding of such a strip 21 spirally, in the manner of a cigar, upon itself or upon a core 22 for instance made of a ceramic material. Such fuel elements could be obtained but with difficulty with uranium strips made by the conventional methods or at least would have been less advantageous due to the less favorable orientation of the gliding planes. The use of strips according to our invention permits of considerably increasing the rate of combustion, and this at much higher temperature, without prohibitive deformations of the fuel element.

It should be noted that, for this kind of application, even strips having shearing planes may be used since they are not subjected to any efforts in the longitudinal direction.

The way of obtaining such strips further gives the possibility of refining the grain during the manufacture by taking advantage of the temporary heating of the metal as it unwinds, whether this heating is due to a mere friction of the tool or to an auxiliary heating (high frequency spire, thermostatic bar, etc.), said heating being possibly followed by a tempering.

With other metals such as zirconium, magnesium, and beryllium, we obtain, by unwinding, strips the texture of which is comparable to that of uranium strips.

Thus we obtain a ribbon of magnesium alloyed with 0.5% zirconium and 0.03 mm. thick by proceeding as follows:

The rotary cylindrical piece 4 had a diameter of 100 mm. It was mounted between the mandrel and the tail stock of a lathe comprising a driving motor the variable speed of which was controlled in accordance with the radius of said cylindrical piece 4 and an accurate control of the displacement of the tool carrying carriage was provided. The cutting tool 2 was made of quick steel 40 mm. wide and its bevel angle was equal to 70°. It was disposed opposite the rotary cylindrical piece in such manner that the top rake and clearance angles were both equal to $+10°$.

The temperature of a piece 4 was brought to 200° C. approximately before the cutting operation. If said piece comprised a hollow recess, heating was advantageously effected by an electrical resistor disposed coaxially in said recess.

Diffraction examination with X-rays of the ribbon that is obtained made it possible to determine that the angle of switching of the gliding planes of the crystallites was 35°.

This ribbon was plastic and behaved very satisfactorily when folded.

In particular, it had the following characteristics:

|  | Elastic limit (in kg./mm.$^2$) | Breaking strength (in kg./mm.$^2$) | Elongation (in percent) |
| --- | --- | --- | --- |
| In the longitudinal direction | 1.85 | 3.58 | 8.1 |
| In the transverse direction | 3.95 | 6.39 | 10.5 |

These magnesium sheets therefore have satisfactory mechanical properties for various nuclear applications such as thermal insulation and sheathing.

We described in the French Patents No. 1,207,197 filed August 30, 1958, No. 1,248,467 filed November 2, 1959 and No. 1,277,320 filed October 10, 1960 solutions brought to the problem of thermal insulation by making use of thin metal sheets, in particular of magnesium coated with a layer of oxyde either applied thereon or created in situ. The metal sheets according to the present invention are particularly suitable for this purpose. As a matter of fact the rough area of one of the faces of these sheets such as there obtained permits a very strong anchoring of the oxyde layers preventing, under the effect of thermal expansions or of vibrations, their removal from the metallic support. On the other hand their very small thickness permits of considerably increasing the ratio of thermal insulation to amount of metal.

Such magnesium ribbons, and also zirconium and beryllium ribbons are quite suitable for surrounding fuel elements.

The same analysis by diffraction of X-rays on a zirconium strip 0.08 mm. thick obtained by unwinding showed that the angle of pivoting of the main sliding plane was about 10°.

In a general manner while we have, in the above description, disclosed what we deem to be practical and efficient embodiments of our invention, we do not wish to be limited thereto as there might be changes made in the arrangement, disposition and form of the parts without departing from the principles of our invention as comprehended within the scope of the appended claims.

What we claim is:

1. A method of making a metal strip which comprises taking a metal of the group consisting of uranium, magnesium, zirconium, beryllium and alloys consisting chiefly of at least one of the above mentioned substances, which metal is of a crystalline nature having a single gliding plane, preparing, by drawing, a cylindrical piece of said metal in such manner that, in every zone of its lateral surface, the gliding plane corresponding to said zone is parallel to said surface, heating said metal piece to a temperature much below the softening temperature of said metal, imparting a movement of revolution to said cylindrical metal piece about its axis, simultaneously driving the linear edge of a cutting tool into the lateral surface of said revolving piece in such manner as to limit the depth of penetration of said tool into said piece to less than 0.2 mm., and to give a value of at least 55° to the angle between the half plane tangent to the lateral surface of said metal piece and passing through the cutting edge of said tool, said half plane extending in the direction corresponding to the rotation of said metal piece, and the half plane of the strip detached by said tool from said metal piece, pulling the strip cut by said tool away from said metal piece, and winding up said metal strip.

2. A method according to claim 1, wherein the metal is magnesium and the temperature at which the metal piece is heated is approximately 200° C.

References Cited by the Examiner

UNITED STATES PATENTS

| | | | |
| --- | --- | --- | --- |
| 1,637,164 | 7/1927 | Talbot | 144—209 X |
| 1,701,889 | 2/1929 | Junker | 29—18 |
| 1,772,726 | 8/1930 | Mengel | 144—209 X |
| 2,163,372 | 6/1939 | Claxton et al. | 144—209 X |
| 2,705,674 | 4/1955 | Chubb | 75—177 |
| 2,784,084 | 3/1957 | Marsh et al. | 75—177 |
| 2,985,576 | 5/1961 | Hollings | 176—90 X |

OTHER REFERENCES

Beck: The Technology of Magnesium and Its Alloys, 1940, pages 399, 400.

Tool Engineer's Handbook, A.S.T.E., 1st ed., 1949, pp. 304, 305, 1377–1380.

Miller: Zirconium, 2d ed., 1957, page 461.

CHARLIE T. MOON, *Primary Examiner.*

WHITMORE A. WILTZ, J. C. HOLMAN,
*Assistant Examiners.*